(12) United States Patent
Alatorre (10) Patent No.: US 11,406,108 B1
(45) Date of Patent: Aug. 9, 2022

(54) COMPACT MOTORIZED TORTILLA FORMING MACHINE

(71) Applicant: Javier Alatorre, Katy, TX (US)

(72) Inventor: Javier Alatorre, Katy, TX (US)

( * ) Notice: Subject to any disclaimer, the term of this patent is extended or adjusted under 35 U.S.C. 154(b) by 37 days.

(21) Appl. No.: 16/899,577

(22) Filed: Jun. 11, 2020

Related U.S. Application Data (60) Provisional application No. 62/859,721, filed on Jun. 11, 2019.

(51) Int. Cl.
*A21C 3/02* (2006.01)
*A21C 11/10* (2006.01)
*A21C 11/04* (2006.01)

(52) U.S. Cl.
CPC ............. *A21C 3/02* (2013.01); *A21C 11/10* (2013.01); *A21C 11/04* (2013.01)

(58) Field of Classification Search
CPC ....... A21C 3/02; A21C 11/004; A21C 11/008; A21C 11/04; A21C 11/10; A21C 9/08
See application file for complete search history.

(56) References Cited

U.S. PATENT DOCUMENTS

| | | | | |
|---|---|---|---|---|
| 3,999,926 | A * | 12/1976 | Victor | A21C 9/08 425/337 |
| 4,405,298 | A | 9/1983 | Blain | |
| 5,180,593 | A | 1/1993 | Mistretta et al. | |
| 5,466,143 | A * | 11/1995 | Suzuki | A21C 3/02 425/140 |
| 5,498,148 | A | 3/1996 | Ouellette et al. | |
| 5,580,583 | A | 12/1996 | Caridis et al. | |
| 5,811,137 | A | 9/1998 | Clark et al. | |
| 5,918,533 | A | 7/1999 | Lawrence et al. | |
| 7,828,543 | B2 | 11/2010 | Herrera | |
| 2005/0244560 | A1 * | 11/2005 | Schultz | A21C 5/00 426/496 |
| 2012/0225151 | A1 | 9/2012 | Ruhe et al. | |
| 2016/0249626 | A1 * | 9/2016 | Rieger | A21C 3/02 426/502 |
| 2020/0205421 | A1 * | 7/2020 | Huang | A21C 9/063 |
| 2020/0260739 | A1 * | 8/2020 | Huang | A21C 9/085 |

FOREIGN PATENT DOCUMENTS

GB          2564161 A    *  1/2019   ............. A21D 8/06

* cited by examiner

*Primary Examiner* — Seyed Masoud Malekzadeh
(74) *Attorney, Agent, or Firm* — Kenneth A. Roddy (57) ABSTRACT

A compact motorized tortilla forming machine utilizing rollers for forming a mass of dough or masa into a flat circular configuration prior to cooking or baking that is of a compact size, having a 2'×2' footprint and can easily fit on and be supported on a countertop or table. The machine includes a roller assembly, a forwardly extending conveyor near its bottom end, a drive motor having a drive sprocket connected with an electrical power source through a relay coupled with a limit switch that provides overload protection, a cover member having an on-off switch, a start button, and an emergency stop button mounted thereon and connected in a circuit between the power source and the drive motor, and an exhaust fan mounted inside of the cover member and connected in a circuit between the power source and the drive motor. A top lid and a rear door are maintained normally closed by magnetic latches and limit switches and when opened, the limit switches prevent electrical current from flowing to the motor.

6 Claims, 8 Drawing Sheets

COMPACT MOTORIZED TORTILLA FORMING MACHINE

CROSS REFERENCE TO RELATED APPLICATION

This application claims priority of U.S. Provisional Application Ser. No. 62/859,721 filed on Jun. 11, 2019.

BACKGROUND OF THE INVENTION

1. Field of the Invention

This invention relates generally to apparatus and machines for making a plurality of flat food items prior to cooking or baking and, more particularly, to a compact motorized tortilla forming machine utilizing rollers for forming a mass of dough or masa into a flat circular configuration prior to cooking or baking.

2. Background Art

Motorized tortilla machines and sheeters that utilize a pair of rollers that produce a sheet of dough or masa of a regular thickness are known in the art. The following are several examples.

Blain, U.S. Pat. No. 4,405,298, discloses a masa sheeter having a sheeting roller provided with a plurality of hoops set in spaced circumferential grooves to carry scrap back into the sheeter infeed zone, a cutter acting against the roller to cut product pieces from the masa sheet between the hoops, and a tensioned flat rectangular wire band passing through the hoops and extending along the surface of the roller for peeling the product pieces from the roller.

Mistretta et al, U.S. Pat. No. 5,180,593, discloses a sheeter machine for processing dough into food products. A pair of rollers are mounted on offset shafts. A cutter mold is supported on pivotal arms. A wedge adjustment apparatus is provided for adjusting the position of the back roller relative to the front roller. A pivotal discharge arm is provided having a spring loaded tensioning assembly. First and second stripper wires are associated with the front roller to allow the cut and molded dough to be stripped from the front roller as it is moving downward toward the discharge arm. Collar assemblies are provided on the ends of the respective roller shafts. A release handle assembly is provided for moving the rear roller away from the front roller. The hopper saddle and the rollers are adapted for mating engagement.

Ouellette et al, U.S. Pat. No. 5,498,148, discloses an apparatus for forming a sheet of material, e.g., dough or masa, from a supply of the material which includes a pair of rotatable rollers that define a gap therebetween into which is input a dough mass and out of which is produced a dough sheet. Fluctuations in the size of the roller gap are sensed by detecting changes in the position of one of the rollers, which changes are input to a servo system that automatically corrects the position of the one roller so as to maintain the proper gap size. The one roller is movably mounted in scissor-like fashion and is driven by a servo motor. A cutter is provided which presses against one of the rollers to cut individual dough portions from the sheet. The ends of the cutter are subjected to a bending moment which induces a camber in the cutter which prevents the central portion of the cutter from bowing away from the roller and ensures uniform pressure between the cutter and roller.

Caridis et al, U.S. Pat. No. 5,580,583, discloses an improved sheeter machine which eliminates the use of at least one stripper wire or doctor blade wherein the dough, including masa, is worked between pinch rolls rotating at selected, infinitely varying speed ratios enabling controlled differential adhesion characteristics between the dough material being sheeted and the surfaces of the rolls. Variable cutter speed ratios acting with the front roll enable control of the cut product size.

Clark et al, U.S. Pat. No. 5,811,137, discloses a sheeter head having a pair of counter rotating internally-driven sheeter rollers, each of which rollers includes an independent internal drive motor and gear box affixed to a nonrotating shaft, along with a nonrotating idle shaft on an opposite end of the roller. The speeds of the drive motors are controlled by an external device such as an inverter speed control. The nonrotating shafts, in conjunction with the absence of any external drive mechanism, allow for sanitary operation, easy clean-up, and a simple and efficient adjustment mechanism for varying a pinch point between the rollers. The adjustment mechanism includes a fixed front roller and horizontal slide plates connected to the axles of a back roller, the slide plate having pegs which slide in associated grooves, one of which is preferably wider than the other to help prevent binding during an adjustment operation. The preferred sheeter head further includes a releasable connecting assembly so that the sheeter head may be decoupled from a discharger conveyor.

Lawrence, et al., U.S. Pat. No. 5,918,533, discloses a system for making tortillas that includes a sheeter, a roller/heater, and an oven. Tortillas are die cut into an oblong shape in the sheeter. The roller/heater rolls the tortillas into a round shape and conductively heats the tortillas simultaneously on the top and bottom surfaces, gelatinizing the food product and sealing in moisture. The tortillas are then baked in an oven.

Herrera, U.S. Pat. No. 7,828,543, discloses an improved dough sheeter having a pair of counter-rotating sheeter rollers and a cutter roller rotating against a front one of the sheeter rollers to cut a pattern into a sheet of dough therebetween. The improvement is the cutter roller being formed from an oil-impregnated wear resistant plastic. The dough sheeter's cutter roller may have an axial shaft, a pair of cutter lift arms including a U-shaped end, and a pair of needle bearing assemblies, each needle bearing assembly located on a corresponding end of the axial shaft.

Ruhe et al., U.S. Published Patent Application 2012/0225151 discloses a thickness control system for a high speed tortilla sheeting machine which can adjust a pinch point gap between a pair of sheeting rollers to maintain a generally uniform thickness of the produced "masa" (i.e., corn dough) sheet. The sheeting machine includes a pinch point gap adjustment device which guides at least one of the rollers through an arcuate path to thereby adjust a magnitude of the pinch point gap. The controller can direct one or more actuators to change the position of the roller along the archive path to thereby change the distance between the two sheeting rollers as desired to produce a masa sheet at the desired preset thickness.

DETAILED DESCRIPTION OF THE INVENTION

As used in conjunction with the present invention, the following terms have the following meanings. The term "compact" means occupying little space compared with others of its type. The terms front, rear, left, right, top and bottom are used to describe the orientation of the components with the observer looking at the front roller control panel, and collection tray at the front of the machine. The wiring and electrical circuitry details of the components are conventional and readily understood by those skilled in the art and therefore are not shown or described in detail.

Referring to the drawings by numerals of reference, there is shown a tortilla forming machine 10 in accordance with the present invention. The machine has a generally rectangular support platform 11 which includes a horizontal rectangular top plate 11A formed of stainless steel having front, rear, left, and right sides and four support legs 11B, each secured at a top end to the underside of the top plate adjacent to a respective corner thereof, and extending vertically downward therefrom terminating in a flanged foot 11C at a bottom end to support the top plate a short distance above a support surface. In a preferred embodiment, the support legs 11B are spaced 24" apart such that the tortilla forming machine 10 can easily fit on and be supported on a countertop or tabletop. A rectangular collection tray 11D is mounted on a front side of the top plate 11A and extends a distance forwardly therefrom. A magnetic latch 12 is mounted on the top surface of the top plate 11A a distance inwardly from a back side thereof.

A roller support assembly 20 is mounted on the top plate 11A of the base support platform 11. The roller support assembly 20 includes a right side plate 21R and left side plate 21L formed of stainless steel plate which are spaced apart in parallel spaced apart relation by transverse connecting rods 22 at their top ends, and their bottom ends are bolted to the top plate 11A by a pair of elongate L-shaped mounting brackets 23. Each side plate 21R and 21L has a generally rectangular configuration with a forwardly extending conveyor roller support portion 24 near its bottom end that extends a short distance over and above the rectangular collection tray 11D.

Two male leafs of a separable lift off hinge 25, each having an attached pin, are mounted on the top plate 11A inwardly in longitudinally spaced apart relation closely adjacent to the right hand side thereof. The mating female leafs of the hinge 25 are mounted at the bottom of a right side panel of a cover member 26 (described hereinafter) closely adjacent to the bottom end thereof. The lift off hinges 25 allow the cover member 26 to be opened and closed and easily removed from the platform when desired.

A drive motor 27 is mounted on the top plate 11A of the base support platform 11 a distance inward from the right hand side thereof. The motor 27 is a 115 volt AC single phase motor having a drive sprocket 27A at one side and is coupled with a limit switch that provides overload protection.

The cover member 26 is preferably formed of stainless steel and has a contiguous outer side panel 26A, a rear side panel 26B, top side panel 26C, a front side panel 26D and a diagonal corner panel 26E extending between the front side panel and top side panel. An ON-OFF switch 28, a start button 29, and an emergency stop button 30 are mounted on the diagonal corner panel 26E and are connected in a circuit between the power source and the drive motor 27. An exhaust fan 31 is mounted on the inside surface of the rear side panel 26B and connected in a circuit between the power source and the drive motor 27.

A pair of transverse rotatable cross bars 32A and 32B disposed in spaced apart relation above the roller assembly 20 near the top ends of the left and right side plates 21R and 21L extend through the side plates and are rotatably mounted in collars 33A and 33B on the outer sides of the side plates. A cam 34A and 34B is mounted on the outer end of each cross bar 32A and 32B adjacent to the collars 33A and 33B, respectively. The cams 34A and 34B are engaged on the lever of front and rear limit switches 35A and 35B, respectively, which are connected in communication with the motor 27 through a relay adjacent to the motor.

A rectangular top lid 36 is secured at a top end to the transverse rotatable cross bar 32A extending between the left and right side plates 21R and 21L. A knob 36A is mounted near the bottom end of the lid 36 for pivotally raising and lowering the top lid between an open and closed position. In the closed position, the cam 34A depresses the lever of the front limit switch 35A to allow electrical current to flow to the motor 27, and when the lid is raised the cam rotates to relieve pressure on the lever of the front limit switch to prevent electrical current from flowing to the motor.

A rectangular rear door 37 is secured at a top end to the transverse rotatable cross bar 32B extending between the left and right side plates 21R and 21L. A knob 37A is mounted near the bottom end of the rear door 37 for pivotally raising and lowering the rear door between an open and closed position. The rear door 37 is maintained in a normally closed condition by the magnetic latch 12 mounted on the top surface of the top plate 11A of the support platform 11. In the closed position, the cam 34B depresses the lever of the rear limit switch 35B to allow electrical current to flow to the motor 27, and when the door is raised the cam rotates to relieve pressure on the lever of the rear limit switch to prevent electrical current from flowing to the motor.

A third limit switch 27A is mounted adjacent to the motor 27 and has an on-off lever which engages the side panel of the cover member 26 in its closed condition. The limit switches are connected in communication with the motor 27 through a relay adjacent to the motor.

Figure 7:
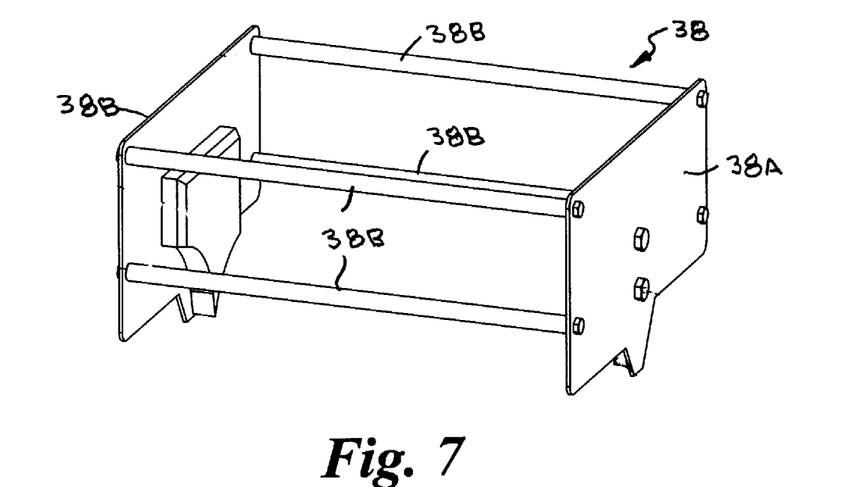
FIG. 7 is a perspective view of the hopper assembly.

A hopper 38 (best seen in FIG. 7) having end plates 38A with a generally V-shaped protrusion at their bottom ends are adjoined in laterally opposed relation by transverse cross bars 38B extending therebetween is removably supported between the right side plate 21R and left side plate 21L on laterally opposed support members 38C secured to the inner facing sides of the left and right side plates above a roller assembly (described below). Dough or masa material is introduced through the hopper 32 into the roller assembly.

The roller assembly includes a cylindrical front roller 39 and rear roller 40, each formed of HDPE food grade plastic which is bonded to a central stainless steel front and rear shaft 39A and 40A, respectively. The front and rear shafts 39A and 40A extend a distance outwardly from the rollers and through apertures in the right side plate 21R and left side plate 21L. The axes of shafts 39A and 40A are substantially parallel but the axis of the shaft 39A of the front roller 39 is in a horizontal plane a short distance below the axis of the shaft 40A of the rear roller 40. The front and rear rollers 39 and 40 are positioned adjacent each other to form a gap therebetween for receiving dough or masa material fed through the hopper 38 and outputting a thin sheet of the material.

The outer left end of the front roller shaft 39A is rotatably secured in a bushing covered by an end cap 41 on the left side plate 21L. The outer right end of the front roller shaft passes through a bushing in the right side plate, and a sprocket 42 and a gear 43 are mounted on the outer portion of the right end of the shaft 39A. The left and right ends end of the rear shaft 40A of the rear roller 34 pass through larger apertures in the left and right side plates 21L and 21R and the left end of the rear shaft is rotatably secured in a first thickness control member 44A by a bushing covered by an end cap 45. The right end of the rear shaft 40A passes through a bushing in a second thickness control member 44B and a sprocket 46 is mounted on the outer portion of the right end of the rear shaft 40A.

The lower end of the first and second thickness control members 38A and 38B are pivotally mounted on the left and right side plates 21R and 21L and their top ends are movably disposed between two laterally spaced apart rectangular stop members 47A and 47B that are adjustably mounted near the top end of the left and right side plates. The spacing between the laterally opposed facing ends of the stop members 47A and 47B may be increased or decreased to set the range of pivotal movement of the thickness control members 38A and 38B, which in turn, determines distance or gap between the front and rear rollers 39 and 40 and the resulting desired thickness of the dough or masa material passing from between the front and rear rollers.

Figure 1:
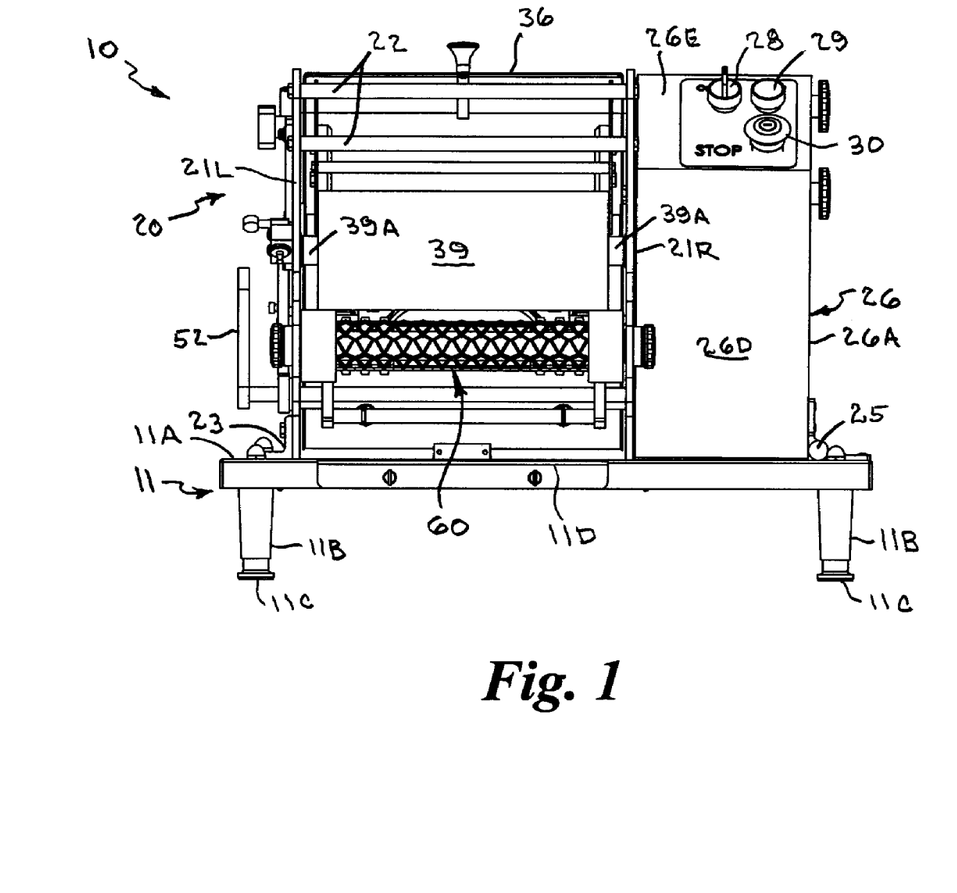
FIG. 1 is a front elevation view of the tortilla forming machine in accordance with the present invention.
Figure 2:
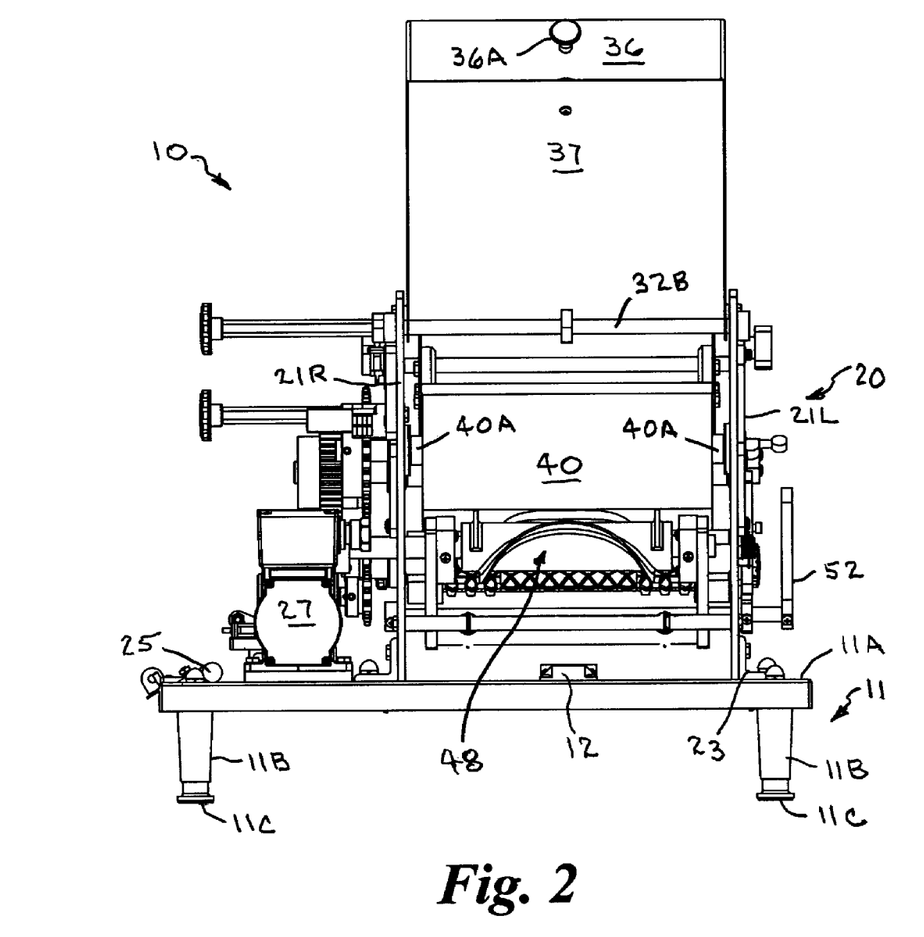
FIG. 2 is a rear elevation view of the tortilla forming machine shown with the right side panel removed.
Figure 3:
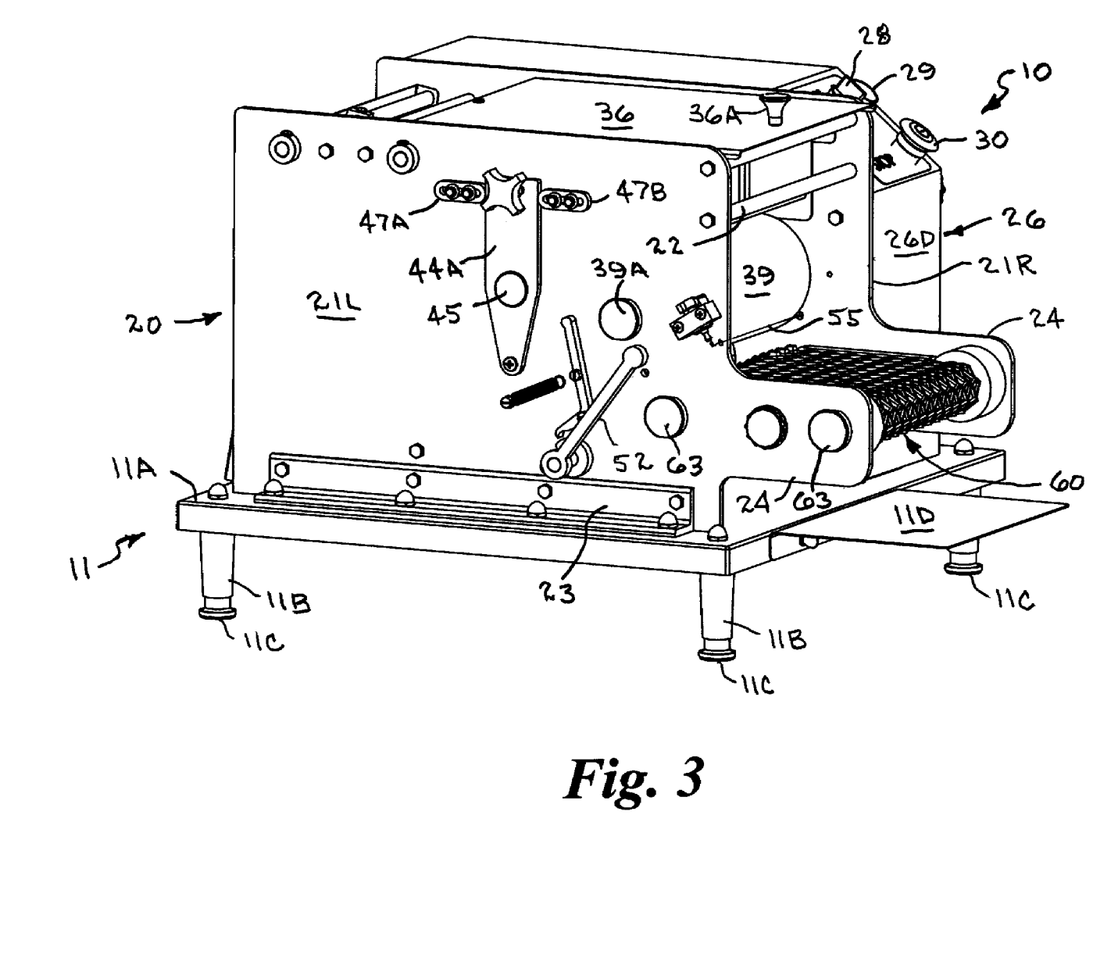
FIG. 3 is a perspective view of the tortilla forming machine, shown from the top and left hand side.
Figure 4:
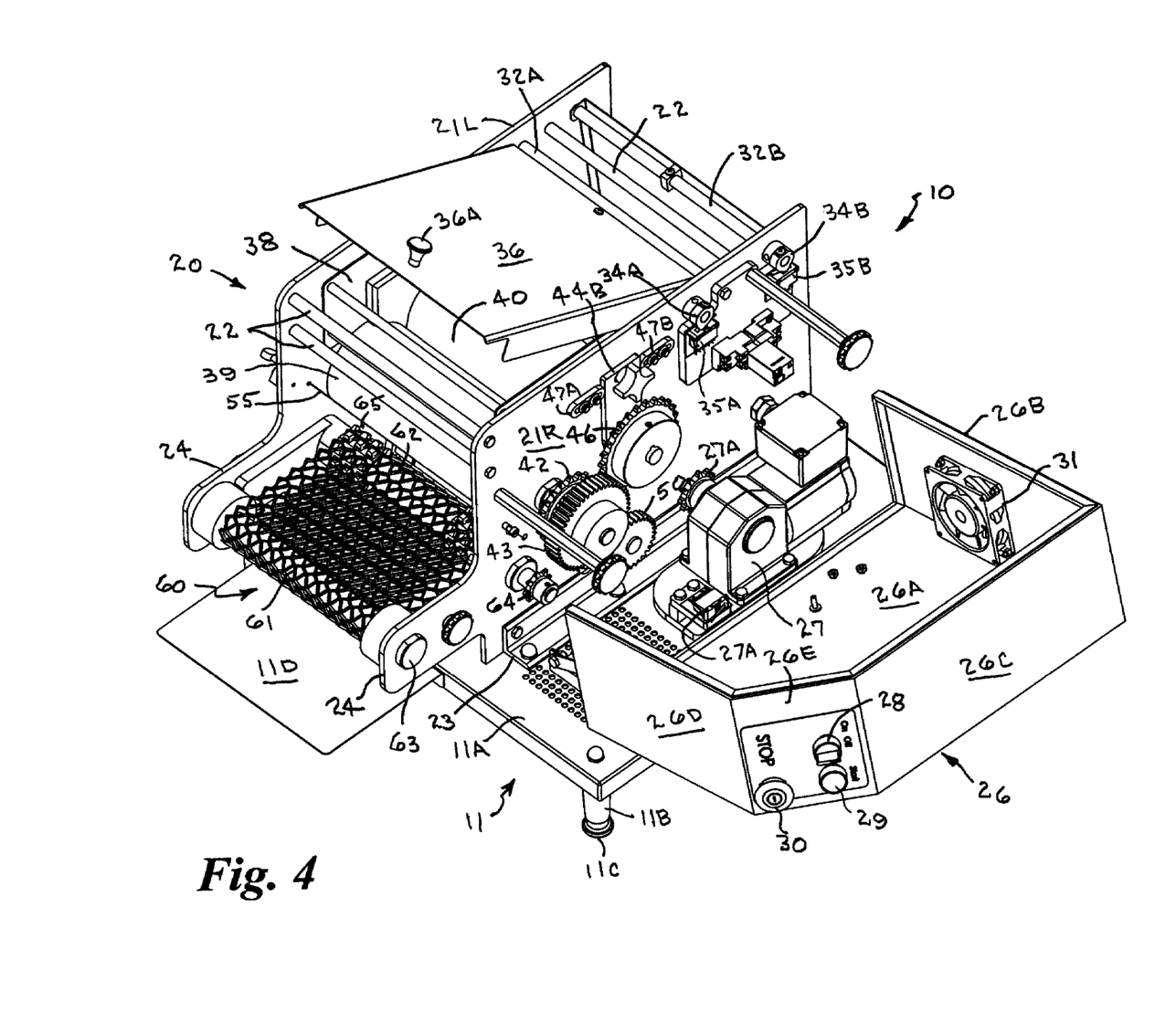
FIG. 4 is a perspective view of the tortilla forming machine, shown from the front, top, and right side, with the top cover and right side cover partially open.
Figure 5:
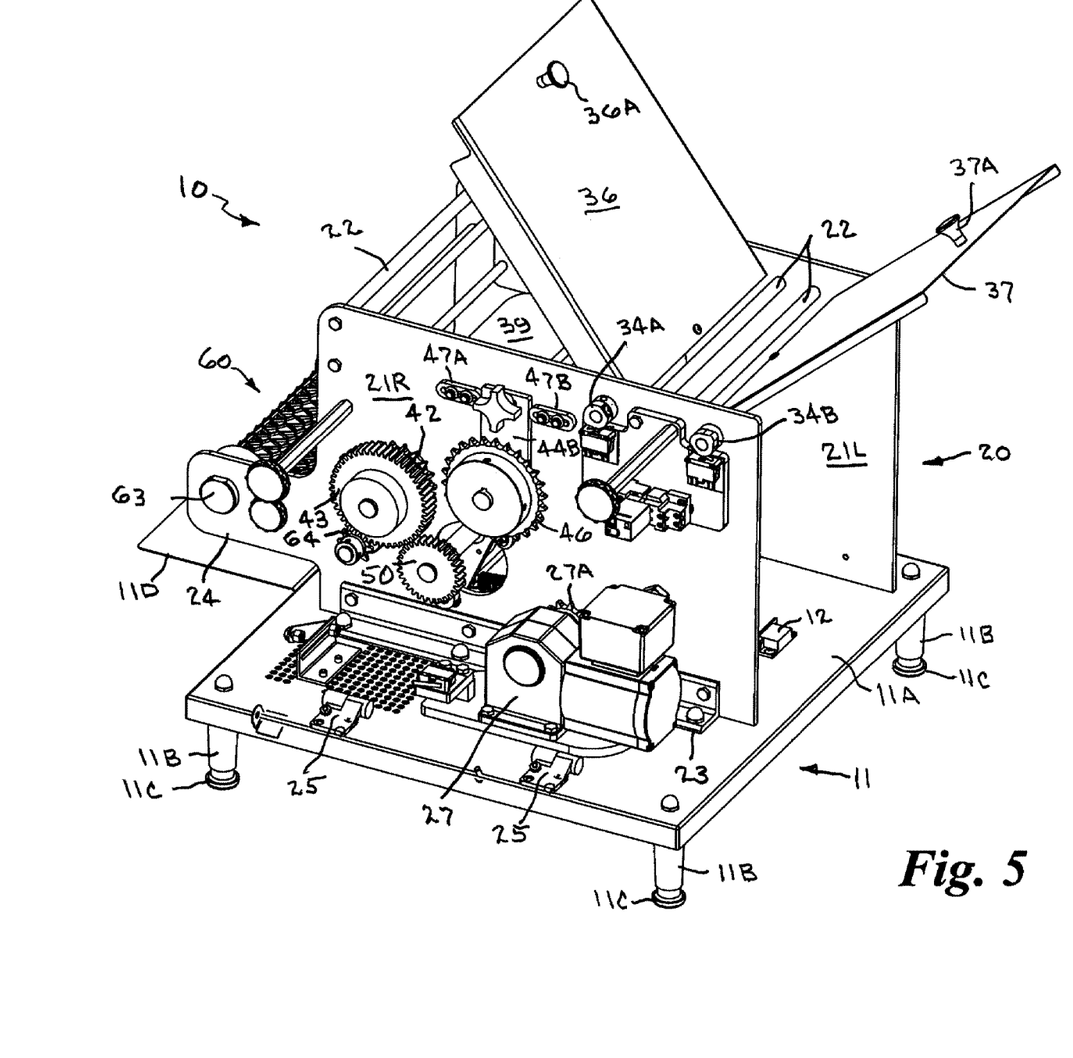
FIG. 5 is a perspective view of the tortilla forming machine, shown from the top, rear, and right side, shown with the right side cover removed and the top lid and rear door partially open.
Figure 6:
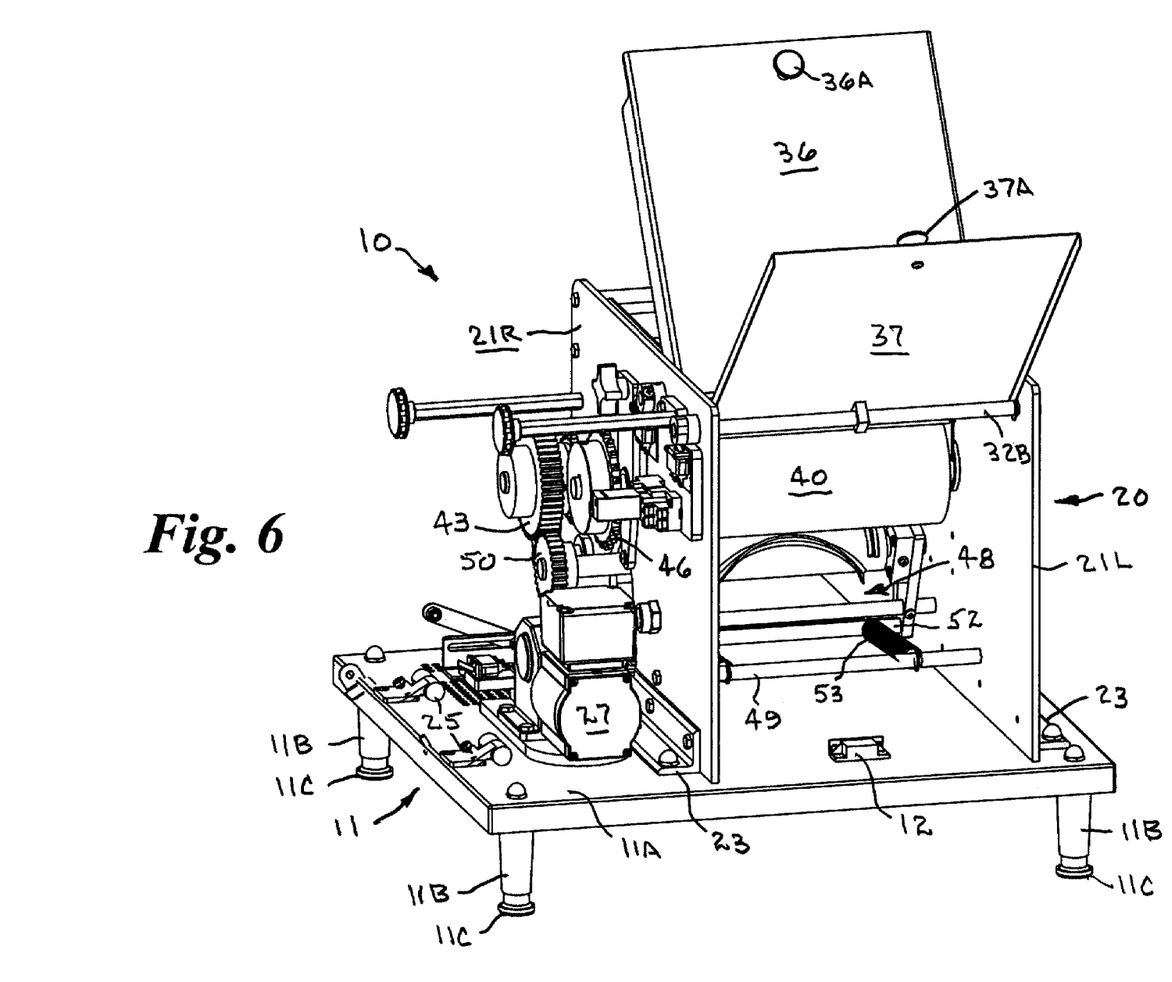
FIG. 6 is a perspective view of the tortilla forming machine, shown from the top, rear, and right side, shown with the right side cover removed and the top lid and rear door partially open showing a portion of the cutter roller.
Figure 8:
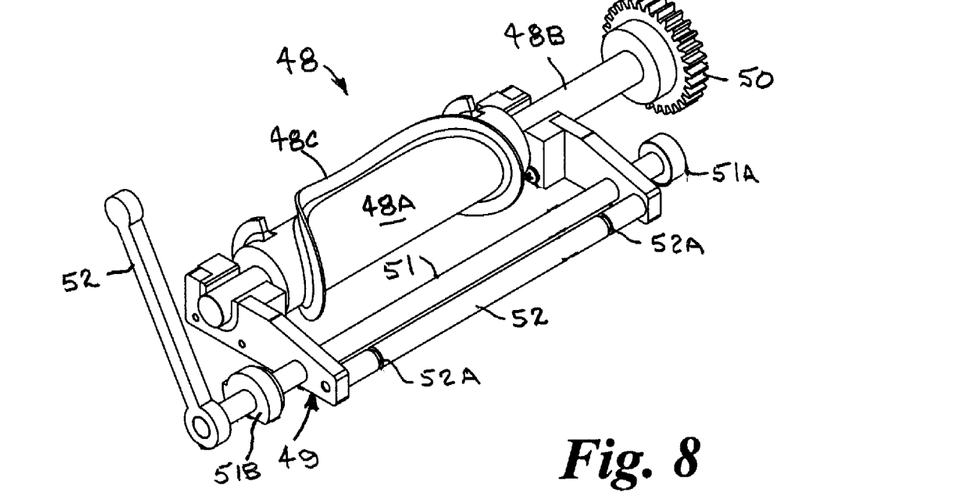
FIG. 8 is a perspective view of the cutter roller assembly, shown from the rear and left side.

A cutter roller assembly 48 is mounted between the left and right side plates 21R and 21L. The cutter roller assembly includes a cylindrical cutter roller 48A formed of HDPE food grade plastic bonded to a central stainless steel shaft 48B which is rotatably supported on a movable roller support frame 49. The plastic cutter roller 48A includes a segmented thin integrally molded ovate or ellipse-shaped raised cutting portion 48C that extends radially outward from the cylindrical roller surface to cut a segmented circular shape in the dough or masa material. One end of the cutter roller shaft 48B extends a distance outward from one side of the support frame 49 and a sprocket 50 is secured to its outer end. The roller support frame 49 includes an elongate lever shaft 51 spaced parallel to, and a distance from, the roller shaft 48B which extends a distance outwardly from both sides of the roller support frame. A circular collar 51A is secured to one end of the lever shaft 51 on the same side as the sprocket 50, and an engagement lever 51C is secured to its opposite end. A semicircular collar 51B having a flat surface is secured to the lever shaft 51 a distance inwardly from the engagement lever 51C. A spring support shaft 52 is mounted at the end of the support frame 49 opposite the cutter roller 48A. The spring support shaft 52 has a pair of laterally spaced apart circumferential grooves 52A for receiving the first end of a pair of extension springs 53. As seen in FIGS. 2 and 6, the second ends of the extension springs 53 are mounted on a horizontal cross bar 49 secured between the left and right side plates 21R and 21L. The extension springs 53 maintain the cutter roller 48A a distance from the front roller 39 when the engagement lever 52 is in a non-cutting position, and when the lever is pivoted to a cutting position, the cutter roller is spring biased into engagement with the underside of the front roller.

The sprocket 50 at the outer end of the of the cutter roller 48A extends through a hole near the lower end of the right side plate 21R and is rotatably engaged with the gear 43 at the outer end of the shaft 39A of the front roller 39.

A stripper wire 55 is secured at each end to the left and right side plates 21R and 21L extends horizontally between each side plate in engagement with the front roller 39 to remove the circular dough or masa cutout formed by cutter roller 48A and adhered the front roller.

A short conveyor belt assembly 60 is mounted at the lower portion of the roller support assembly 20. The conveyor belt assembly includes a front roller 61 and a rear roller 62, each formed of HDPE food grade plastic which is bonded to a central stainless steel front and rear shaft 61A and 62A, respectively. The front shaft 61A extends a distance outwardly from the roller and through apertures in the forwardly extending conveyor roller support portion 24 near the bottom end of the right and left side plates 21R and 21L and is rotatably secured a short distance over and above the rectangular collection tray 11D by bushings covered by end caps 63. The shaft 62A of the rear roller 62 extends a distance outwardly from the roller and through apertures in the right side plate 21R and left side plate 21L. The outer left end of the rear roller shaft 62A is rotatably secured in a bushing covered by an end cap 63 on the left side plate 21L. The outer right end of the front roller shaft passes through a bushing in the right side plate, and a sprocket 64 and is mounted on the right end of the shaft 62A. The front roller 61 and a rear roller 62 may have a sprocket collar 65 at each end. A wide stainless steel wire mesh conveyor belt 66 encircles the front and rear rollers 61 and 62 and is engaged with the sprocket collars 65 to move in an endless loop.

Figure 9:
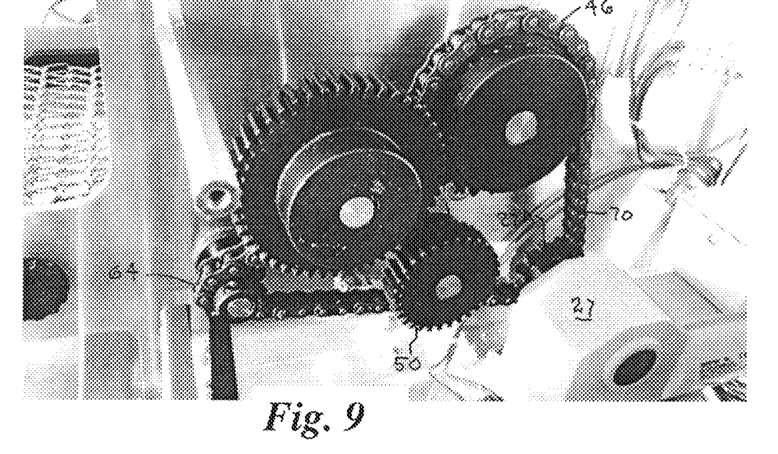
FIGS. 9 and 10 are pictorial views showing the endless chain engagement with the sprockets of the rollers.
Figure 10:
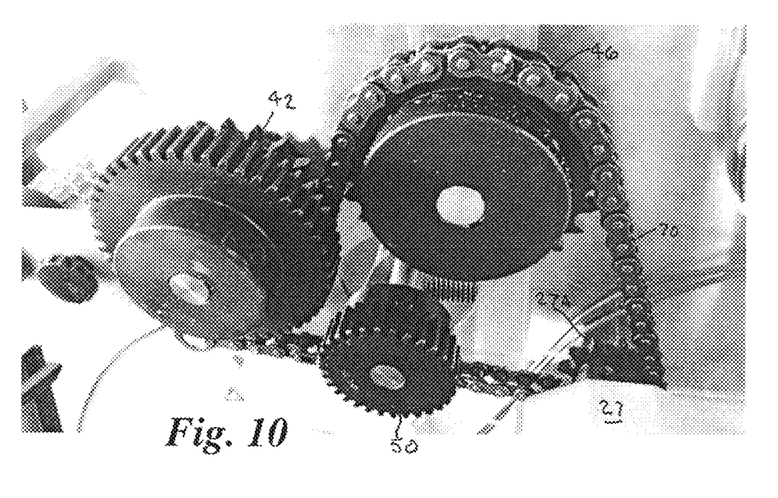

As seen in from the right hand side in FIGS. 9 and 10, the motor drive sprocket 27A rotates in a counterclockwise direction. An endless loop chain 70 extends partially around and under the drive sprocket 27A of the motor 27; along the bottom portion of the cutter roller sprocket 50, rotating it counterclockwise; around a front portion of the front conveyor belt roller sprocket 64, rotating it counterclockwise; along the underside of the front roller sprocket 42, rotating it counterclockwise; along the top portion of the rear roller sprocket 46, rotating it counterclockwise; and then back under the motor drive sprocket 27A.

While the present invention has been disclosed in various preferred forms, the specific embodiments thereof as disclosed and illustrated herein are considered as illustrative only of the principles of the invention and are not to be considered in a limiting sense. The claims are intended to include all novel and non-obvious combinations and subcombinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A compact motorized tortilla forming machine for forming a mass of dough or masa into a flat circular configuration prior to cooking or baking, comprising:

a base platform having a horizontal rectangular top plate having front, rear, left, and right sides and four support legs, each secured at a top end to an underside of the top plate adjacent to a respective corner thereof and extending vertically downward therefrom terminating in a flanged foot at a bottom end to support the top plate and tortilla forming machine a distance above a support surface, a rectangular collection tray mounted on a front side of the top plate to extend a distance forwardly therefrom, and a magnetic latch mounted on the top surface of the top plate a distance inwardly from a back side thereof;

a roller support assembly mounted on the base platform top plate which includes a right side plate and a left side plate spaced apart in parallel spaced apart relation by transverse connecting rods at the top ends thereof, each side plate bolted at bottom ends to the top plate by mounting brackets, and each side plate having a rectangular configuration with a forwardly extending conveyor roller support portion adjacent to bottom ends of each side plate that extends a short distance over and above the rectangular collection tray;

a drive motor mounted on the top plate of the base support platform disposed a distance inward from the right side thereof, the drive motor connected with an electrical power source through a relay and coupled with a limit switch that provides overload protection, and the drive motor having a drive sprocket;

a cover member having a contiguous outer side panel, a rear side panel, a top side panel, a front side panel and a diagonal corner panel extending between the front side panel and top side panel, the outer side panel connected at a bottom end to the top plate of the base support platform by separable lift off hinges mounted adjacent to the right side of the base platform top plate to allow the cover member to be selectively opened, closed, and removed, from the top plate platform;

an on-off switch, a start button, and an emergency stop button mounted on the diagonal corner panel of the cover member and connected in a circuit between a power source and the drive motor, and an exhaust fan mounted on the inside surface of the rear side panel of the cover member and connected in a circuit between the power source and the drive motor;

first and second transverse rotatable cross bars disposed in spaced apart relation above the roller support assembly adjacent to the top ends of the left and right side plates extending through the side plates and rotatably mounted in collars on outer sides of the side plates, and a first and a second cam mounted on an outer end of each cross bar adjacent to the collars, respectively, each cam engaged on a lever of front and rear limit switches, respectively, which are connected in communication with the drive motor through the relay;

a rectangular top lid secured at a top end to the first transverse rotatable cross bar disposed between the left and right side plates having a knob mounted adjacent to the bottom end thereof for pivotally raising and lowering the top lid between an open and closed position wherein the first cam depresses the lever of the front limit switch to allow electrical current to flow to the motor, and when the top lid is raised the first cam rotates to relieve pressure on the lever of the front limit switch to prevent electrical current from flowing to the motor;

a rectangular rear door secured at a top end to the second transverse rotatable cross bar disposed between the left and right side plates, the rear door having a knob mounted adjacent to a bottom end thereof for pivotally raising and lowering the rear door between an open and closed position, wherein the rear door is maintained in a normally closed condition by the magnetic latch mounted on the top surface of the top plate of the support platform and in the closed position, the second cam depresses the lever of the rear limit switch to allow electrical current to flow to the motor, and when the door is raised the second cam rotates to relieve pressure on the lever of the rear limit switch to prevent electrical current from flowing to the motor;

a side panel limit switch mounted adjacent to the motor in communication with the motor through the relay having an on-off lever which engages the outer side panel of the cover member in its closed condition; and a hopper having end plates with a generally V-shaped protrusion at their bottom ends adjoined in laterally opposed relation by the transverse rotatable cross bars extending therebetween removably supported between the right side plate and left side plate of the roller support assembly, through which dough or masa material is introduced through the hopper and into the roller assembly.

2. The compact motorized tortilla forming machine according to claim 1, wherein:

the support legs are spaced approximately 24" apart such that the tortilla forming machine including the base platform, the rectangular top plate, and the roller support assembly mounted thereon will fit on and be supported on the support surface.

3. The compact motorized tortilla forming machine according to claim 1, wherein:

the roller support assembly comprises a cylindrical front roller and rear roller, each formed of HDPE food grade plastic which is bonded to a central stainless steel front shaft and rear shaft, respectively which extend a distance axially outwardly from the respective rollers and through respective apertures in the right side plate and left side plate of the roller support assembly;

the axes of the front and rear shafts of the front roller and rear roller disposed substantially parallel and the axis of the shaft of the front roller disposed in a horizontal plane a short distance below the axis of the shaft of the rear roller, the front and rear rollers positioned adjacent to each other to form a gap therebetween for receiving dough or masa material which is ted through the hopper and passes between the front and rear rollers and formed exits as a thin sheet of the dough or masa material.

4. The compact motorized tortilla forming machine according to claim 3, wherein:

the front roller shaft has an outer left end rotatably secured in a bushing covered by an end cap on the left side plate of the roller support assembly and an outer right end that passes through a bushing in the right side plate of the roller support assembly, and a front roller sprocket and a gear are mounted on an outer portion of the right end of the front roller shaft;

the rear roller shaft has left and right outer ends that pass through apertures in the left and right side plates of the roller support assembly, the left end of the rear shaft is rotatably secured in a first thickness control member by a bushing covered by an end cap, the right end of the rear shaft passes through a bushing in a second thickness control member, and a rear roller sprocket is mounted on an outer portion of the right end of the rear shaft;

the first and second thickness control members have a lower end pivotally mounted on the left and right side plates of the roller support assembly and their top ends are movably disposed between two laterally spaced apart stop members that are adjustably mounted adjacent to the top end of the left and right side plates of the roller support assembly;

whereby spacing between laterally opposed facing ends of the first and second stop members is selectively increased or decreased to set a range of pivotal movement of the thickness control members which, in turn, determines the distance or gap between the front and rear rollers and a resulting thickness of the dough or masa material passing outward from between the front and rear rollers.

5. The compact motorized tortilla forming machine according to claim 4, further comprising:

a cutter roller assembly including a cutter roller support frame movably mounted between the left and right side plates of the roller support assembly;

the cutter roller assembly includes a cylindrical cutter roller formed of HDPE food grade plastic bonded to a central stainless steel shaft that is rotatably supported on the cutter roller support frame, the cutter roller having a segmented integrally molded ovate or ellipse-shaped raised cutting portion extending radially outward from the cylindrical cutter roller surface configured to cut a segmented circular shape in the dough or masa material;

one end of the cutter roller shaft extends a distance outward from one side of the cutter roller support frame and a cutter roller sprocket is secured to an outer end thereof, the cutter roller sprocket at the outer end of the of the cutter roller extending through a hole near the lower end of the right side plate of the roller support assembly and rotatably engaged with the gear at the outer end of the shaft of the front roller;

an elongate lever shaft spaced parallel to, and a distance from, the cutter roller shaft extending a distance outwardly from both sides of the cutter roller support frame, a circular collar secured to one end of the lever shaft on the same side as the sprocket, an engagement lever secured to its the opposite end of the lever shaft, and a semicircular collar having a flat surface secured to the lever shaft a distance inwardly from the engagement lever;

a spring support shaft mounted on the lever support frame having a pair of laterally spaced apart circumferential grooves for receiving first ends of a pair of extension springs, second ends of the extension springs mounted on a horizontal cross bar secured between the left side plate and right side plate of the roller support assembly, wherein the extension springs maintain the cutter roller distance from the front roller when the engagement lever is in a non-cutting position, and when the lever is pivoted to a cutting position, the cutter roller is spring biased into engagement with the front roller; and a stripper wire secured at opposed ends to the left and right side plates of the roller support assembly to extend horizontally therebetween in engagement with the front roller to remove the circular dough or masa cutout formed by the cutter roller and adhered the front roller.

6. The compact motorized tortilla forming machine according to claim 5, further comprising:

a short conveyor belt assembly mounted at a lower portion of the roller support assembly including a front roller and a rear roller each formed of HDPE food grade plastic bonded to a central stainless steel front shaft and rear shaft, respectively;

the front shaft extending a distance outwardly from the front roller and through apertures in the forwardly extending conveyor roller support portion adjacent to the bottom end of the right and left side plates of the roller support assembly and is rotatably secured a distance over and above the rectangular collection tray by bushings covered by end caps;

the rear shaft of the rear roller extending a distance outwardly from the rear roller and through apertures in the right side plate and left side plate of the roller support assembly and rotatably secured in a bushing covered by an end cap on the left side plate, the opposed outer end of rear roller shaft passing through the bushing in the right side plate of the roller support assembly, and the sprocket mounted on the opposed outer end of the rear roller shaft;

a stainless steel wire mesh conveyor belt encircling the front and rear rollers and engaged with the sprocket to move in an endless loop; and an endless loop chain extending partially around and under the drive sprocket of the motor, along a bottom portion of the cutter roller sprocket to rotate the cutter roller, around a front portion of the front conveyor belt roller sprocket to rotate the front conveyor belt roller, along the underside of the front roller to rotate the front roller, along a top portion of the rear roller sprocket to rotate the rear roller, and then back under the motor drive sprocket.

* * * * *